United States Patent
Zoellner et al.

(10) Patent No.: US 11,535,575 B2
(45) Date of Patent: Dec. 27, 2022

(54) LEAD-FREE INITIATING AGENTS OR INITIATING AGENT MIXTURES

(71) Applicant: DYNITEC GMBH, Troisdorf (DE)

(72) Inventors: Helmut Zoellner, Meerbusch (DE); Manuel Joas, Eitor (DE); Rainer Schirra, Lohmar (DE); Kemal Kaplan, Troisdorf (DE)

(73) Assignee: DYNITEC GMBH, Troisdorf (DE)

( * ) Notice: Subject to any disclaimer, the term of this patent is extended or adjusted under 35 U.S.C. 154(b) by 1006 days.

(21) Appl. No.: 16/313,493

(22) PCT Filed: Jul. 10, 2017

(86) PCT No.: PCT/EP2017/067249
§ 371 (c)(1),
(2) Date: Dec. 27, 2018

(87) PCT Pub. No.: WO2018/011134
PCT Pub. Date: Jan. 18, 2018

(65) Prior Publication Data
US 2019/0256438 A1    Aug. 22, 2019

(30) Foreign Application Priority Data

Jul. 11, 2016 (EP) .................................. 16178863

(51) Int. Cl.
| | |
|---|---|
| *C06B 41/00* | (2006.01) |
| *C07F 1/08* | (2006.01) |
| *C07F 1/10* | (2006.01) |
| *C07F 3/06* | (2006.01) |
| *C07F 15/02* | (2006.01) |
| *C07F 15/04* | (2006.01) |
| *C06C 7/00* | (2006.01) |
| *C06C 9/00* | (2006.01) |
| *C06B 43/00* | (2006.01) |
| *C07F 13/00* | (2006.01) |

(52) U.S. Cl.
CPC .............. *C06B 41/00* (2013.01); *C06B 43/00* (2013.01); *C06C 7/00* (2013.01); *C06C 9/00* (2013.01); *C07F 1/08* (2013.01); *C07F 1/10* (2013.01); *C07F 3/06* (2013.01); *C07F 13/005* (2013.01); *C07F 15/025* (2013.01); *C07F 15/045* (2013.01)

(58) Field of Classification Search
None
See application file for complete search history.

(56) References Cited

U.S. PATENT DOCUMENTS

| | | | |
|---|---|---|---|
| 10,196,477 B2 * | 2/2019 | Gozin | .................. C07D 487/18 |
| 2008/0200688 A1 | 8/2008 | Huynh | |
| 2016/0280614 A1 | 9/2016 | Nesveda | |
| 2017/0226270 A1 * | 8/2017 | Gozin | .................. C07D 403/06 |

FOREIGN PATENT DOCUMENTS

| | | |
|---|---|---|
| CN | 101618866 A | 1/2010 |
| EP | 2450329 A2 | 5/2012 |
| EP | 2450330 A2 | 5/2012 |
| WO | 2015067228 A1 | 5/2015 |

OTHER PUBLICATIONS

Pei-Pei Liu et al., Supporting Information for "Toward Tuning the Bulk Magnetic Behaviors of Metal-Azido Materials by Organic Pillars", Chem. Mater. 2007, 19, p. 2724-2726.
Matyas R. et al., "Primary Explosives" Springer Publishers Heidelberg Berlin 2013, preface, pp. 331-334.
Bi-Dong Wu et al., Z. Anorg. Chem. 2014 640(7), pp. 1467-1473.
Pei-Pei Liu et al., Chem. Mater. 2007, 19, 2724-2726.
Jing-Jing Liu et al., Journal of Molecular Structure, 919 (2009), pp. 189-195.
Jichnan Zang et al. Chem. Mater. 2016, 28, pp. 1472-1480.
35th International Pyrotechnics Seminar Jul. 3, 2008, pp. 201-206.
Bi-Dong Wu et al., Eur. J. Inorg. Chem. 2011, pp. 2616-2623.
Jia-Cheng Liu et al., J. Chem. Soc., Dalton Trans., 1999, pp. 2337-2342.

* cited by examiner

*Primary Examiner* — Aileen B Felton
(74) *Attorney, Agent, or Firm* — Abel Schillinger, LLP

(57) ABSTRACT

Subject matter of the invention are lead-free initiating agents or initiating agent mixtures and initiating and igniting compositions which contain the lead-free initiating agents or initiating agent mixtures.

20 Claims, No Drawings

LEAD-FREE INITIATING AGENTS OR INITIATING AGENT MIXTURES

BACKGROUND OF THE INVENTION

1. Field of the Invention

The invention relates to lead-free initiators or lead-free initiator mixtures and initiating compositions and igniting compositions which contain the lead-free initiators or lead-free initiator mixtures.

2. Discussion of Background Information

Initiators and initiator mixtures detonate even in small amounts after triggering of a chemical reaction. The triggering of the chemical reaction can occur mechanically, electrically of thermally. The initiators and initiator mixtures react in initiating compositions and igniting compositions (initiating charge or igniting charge) with appropriate sensitivity to the external mechanical, electrical or thermal impulse. In initiating compositions, they additionally serve as initial charge for producing a detonation which is sufficiently powerful to initiate the starting charge. Initiators have been used for more than 100 years for initiating secondary explosives (e.g. hexogen and nitropenta).

An initiator or an initiator mixture has to meet particular requirements:

Initiating capability: For use in detonators, the initiator or the initiator mixture has to be able to initiate a secondary explosion reliably even in an amount of less than 100 mg.

Thermal stability: The initiator or the initiator mixture has to have an appropriate thermal stability in order to retain its function after storage in a temperature range from at least −54° C. to at least +71° C.

Sensitivity: The initiator or the initiator mixture has to be sufficiently sensitive to be detonated by a mechanical, electrical or thermal impulse, but at the same time must be so insensitive that production/handling can be carried out safely and no undesired spontaneous detonation of the initiator or the initiator mixture occurs.

Compatibility: The initiator or the initiator mixture has to be compatible with customary explosives and also nonexplosive substances and materials as occur in initiating compositions and igniting compositions.

At present, lead azide, lead-styphnate and lead picrate are typically used as initiators or initiator mixtures. However, these materials have been on the candidate list of substances of very high concern (SVHC) of the (EU) regulation No. 1907/2006 (REACH) since the end of 2011 and are accordingly threatened with requiring approval, for which reason new initiators or initiator mixtures which are not based on the abovementioned compounds and generally do not contain any lead are needed.

It was therefore an object of the present invention to provide lead-free initiators or initiator mixtures which satisfy the abovementioned requirements for initiating compositions and igniting compositions which correspond to the previous structure of initiating compositions and igniting compositions and have the required functionality within an initiator chain.

SUMMARY OF THE INVENTION

The present invention provides a lead-free initiator or lead-free initiator mixture comprising one or more transition metal complexes of the following formula:

[central metal(azido)$_{1-3}$(high-energy ligand)$_{0.5-3}$]$_n$.

Primary initiating compositions convert the external impulse into a chemical, detonative reaction and typically have a three-stage structure. The first charge is referred to as initiating charge, the second charge as initial charge and the third charge as starting charge. The initiating charge generally contains an initiator mixture of lead azide and lead styphnate and also further explosive and nonexplosive additives. The initial charge generally contains the initiator lead azide. The starting charge generally consists of a readily initiatable secondary explosive such as nitropenta or hexogen.

Primary igniting compositions convert the external impulse into a chemical, deflagrative reaction and generally have a one- to three-stage structure and are, depending on the type of construction, referred to as ignition pieces or ignition pills, with the part containing the initiator/initiator mixture being referred to as igniting charge.

The lead-free initiator or the lead-free initiator mixture can be used in mechanically, electrically or thermally triggered initiating compositions or igniting compositions both in the initiating charge or the ignitor charge and also in the initial charge as replacement for lead azide, lead styphnate and lead picrate.

The lead-free initiators of the invention comprise transition metal complexes of the general formula

[central metal(azido)$_{1-3}$(high-energy ligand)$_{0.5-3}$]$_n$.

The index n in the above formula indicates that not only the basis complexes having one central metal atom but also polycoordinated complexes or polynuclear complexes are encompassed, for example

[(central metal)$_2$(azido)$_4$(high-energy ligand)]
where n=2, or
[(central metal)$_3$(azido)$_6$(high-energy ligand)$_2$] where n=3.

Due to the many possible polycoordinated complexes and thus many possible values for the index n, a corresponding indication of a range for the index n would constitute an unreasonable restriction of the subject matter of the invention. This is especially the case because determination of the degree of coordination or the number of central metal atoms in the polycoordinated complex is difficult.

In general, the formula can always be abbreviated to the general formula

[central metal(azido)$_{1-3}$(high-energy ligand)$_{0.5-3}$] by excluding the respective value of the index n.

In a preferred embodiment, the lead-free initiators of the present invention consist exclusively of the transition metal complexes mentioned.

The central metal of the above transition metal complex can be selected from the 3d or 4d transition metals, preferably manganese, iron, nickel, copper, zinc or silver. The individual metals can be present in various oxidation states, but are encompassed by the present invention.

The high-energy ligand of the above transition metal complex can be selected from the group consisting of 3-amino-1-nitroguanidine, 4-amino-3-hydrazino-1,2,4-triazole, 3-hydrazino-1-methyl-1,2,4-triazole, 1-methyl-1,2,4-triazole, 4-methyl-1,2,4-triazole, 3-amino-1-methyl-1,2,4-triazole, 3-amino-2-methyl-1,2,4-triazole, 4-amino-1,2,4-triazole, 4,4'-bis-1,2,4-triazole, 4,4'-azobis(1,2,4-triazole), 1,1'-carbonyl-bis-1,2,4-triazole, 1-methyltetrazole, 2-methyltetrazole, 1-methyl-5-aminotetrazole, 2-methyl-5-aminotetrazole, 1,5-diaminotetrazole, 1-methyl-5-nitrotetrazole, 2-methyl-5-nitrotetrazole, 5-cyano-1-methyltetrazole, 5-cyano-2-methyltetrazole, 5-chloro-1-methyltetrazole, 5-chloro-2-methyltetrazole, 1-methyl-5-(1-methylhydrazinyl)tetrazole, 1,2-bis[5-(1-methylhydrazinyl)tetrazol-1-yl] ethane, 1,2-bis[5-(1-methylhydrazinyl)tetrazol-1-yl]propane, 1,4-bis[5-(1-methylhydrazinyl)tetrazol-1-yl]butane, 5,5'-bis-(1-methyltetrazole), 5,5'-bis(2-methyltetrazole), 1,2-di(tetrazol-1-yl)ethane, 1,2-di(tetrazol-1-yl)propane, 1,4-di(tetrazol-1-yl)butane, tris(2-(tetrazol-1-yl)-ethyl) amine, 1,1'-bis(1-methyltetrazol-5-yl)methane, 1,2-bis(1-methyltetrazol-5-yl)ethane, 1,2-bis(5-amino-tetrazol-1-yl) ethane, 1,3-bis(5-aminotetrazol-1-yl)-propane, 1,4-bis(5-aminotetrazol-1-yl)butane, 2-methyl-5-(tetrazol-1-yl) tetrazole, 1-(5-amino-1-methyl-1,2,4-triazol-3-yl)tetrazole, 5,5'-diamino-1,1'-dimethyl-3,3'-bis(1,2,4-triazole), 1,1'-dimethyl-3,3'-bis-1,2,4-triazole, 1,1'-bis(2-methyltetrazol-5-yl)amine, 1-methyl-1,1'-bis(2-methyltetrazol-5-yl)amine, 1,1'-di-(1,2,4-triazol-1-yl)methane or 1,1'-di(1,2,4-triazol-1-yl)methanimine.

As high-energy ligands, preference is given to 3-amino-1-nitroguanidine, 4-amino-3-hydrazino-1,2,4-triazole, 3-hydrazino-1-methyl-1,2,4-triazole, 1-methyl-1,2,4-triazole, 3-amino-1-methyl-1,2,4-triazole, 4-amino-1,2,4-triazole, 4,4'-bis-1,2,4-triazole, 1-methyltetrazole, 2-methyltetrazole, 1-methyl-5-amino-tetrazole, 2-methyl-5-aminotetrazole, 2-methyl-5-nitrotetrazole, 5-cyano-2-methyltetrazole, 1-methyl-5-(1-methylhydrazinyl)tetrazole, 1,2-bis[5-(1-methyl-hydrazinyl)tetrazol-1-yl]ethane, 5,5'-bis(2-methyl-tetrazole), 1,2-di(tetrazol-1-yl)ethane, 1,2-di-(tetrazol-1-yl) propane, 1,4-di(tetrazol-1-yl)butane, tris(2-(tetrazol-1-yl) ethyl)amine, 2-methyl-5-(tetra-zol-1-yl)tetrazole, 1,1'-dimethyl-3,3'-bis-1,2,4-triazole, 1-methyl-1,1'-bis(2-methyltetrazol-5-yl)amine or 1,1'-di(1,2,4-triazol-1-yl) methanimine.

The initiators or initiator mixtures of the invention display good thermal stability, appropriate sensitivity and a good initiating capability. In addition, the initiators/initiator mixtures contain only lead-free constituents.

The above-described transition metal complexes have decomposition temperatures of at least 100° C. The mechanical sensitivities are in ranges typical of primary explosives: friction sensitivity of <80 N and impact sensitivity of <3.0 J, in each case determined by the BAM methods (BAM friction test and BAM drop hammer test). Furthermore, the abovementioned transition metal complexes have a good initiating capability; thus, less than 100 mg of the transition metal complex are sufficient to initiate a customary secondary explosive. The above-described transition metal complexes are also compatible with one another, with customary explosives (e.g. tetrazene, nitropenta and hexogen) and also nonexplosive materials which occur in customary initiating compositions and igniting compositions (e.g. antimony(III) sulfide, barium(II) nitrate).

DETAILED DESCRIPTION OF EMBODIMENT OF THE INVENTION

Example

Copper(II) sulfate pentahydrate and 1,2-di(tetrazol-1-yl) ethane are dissolved in a mixture of water and ethanol at 75° C. with stirring. Sodium azide is dissolved in a mixture of water and ethanol and slowly added dropwise to the reaction solution having a temperature of 75° C. while stirring. After addition is complete, the total solution is cooled and the solid obtained is filtered off with suction and washed with water and ethanol. The resulting poly{tetraazidodi(tetrazol-1-yl)ethanedicopper(II)} product is dried under vacuum.

Poly{tetraazidodi(tetrazol-1-yl)ethanedicopper(II)} decomposes at 195° C. and has a friction sensitivity of 0.1 N (BAM method) and an impact sensitivity of 2.0 J (BAM method). 20 mg of poly{tetraazidodi(tetrazol-1-yl)ethanedicopper(II)} are able to initiate nitropenta reliably.

What is claimed is:

1. A lead-free initiator or lead-free initiator mixture, wherein the initiator or initiator mixture comprises one or more transition metal complexes of the following formula
[central metal(azido)$_{1-3}$(high-energy ligand)$_{0.5-3}$].

2. The initiator or initiator mixture of claim 1, which comprises a transition metal complex of the formula
[central metal(azido)$_{1-3}$(high-energy ligand)$_{0.5-3}$].

3. The initiator or initiator mixture of claim 1, which comprises a transition metal complex of the formula
[central metal(azido)$_{1-3}$(high-energy ligand)$_{0.5-3}$].

4. The initiator or initiator mixture of claim 1, wherein the central metal is selected from the 3d and 4d transition metals.

5. The initiator or initiator mixture of claim 1, wherein the central metal is manganese.

6. The initiator or initiator mixture of claim 1, wherein the central metal is iron.

7. The initiator or initiator mixture of claim 1, wherein the central metal is nickel.

8. The initiator or initiator mixture of claim 1, wherein the central metal is copper.

9. The initiator or initiator mixture of claim 1, wherein the central metal is zinc.

10. The initiator or initiator mixture of claim 1, wherein the central metal is silver.

11. The initiator or initiator mixture of claim 1, wherein the high-energy ligand is selected from 3-amino-1-nitroguanidine, 4-amino-3-hydrazino-1,2,4-triazole, 3-hydrazino-1-methyl-1,2,4-triazole, 1-methyl-1,2,4-triazole, 4-methyl-1,2,4-triazole, 3-amino-1-methyl-1,2,4-triazole, 3-amino-2-methyl-1,2,4-triazole, 4-amino-1,2,4-tri-azole, 4,4'-bis-1,2,4-triazole, 4,4'-azobis(1,2,4-triazole), 1,1'-carbonyl-bis-1,2,4-triazole, 1-methyltetrazole, 2-methyltetrazole, 1-methyl-5-aminotetrazole, 2-methyl-5-aminotetrazole, 1,5-diaminotetrazole, 1-methyl-5-nitrotetrazole, 2-methyl-5-nitrotetra-zole, 5-cyano-1-methyltetrazole, 5-cyano-2-methyltetrazole, 5-chloro-1-methyltetrazole, 5-chloro-2-methyltetrazole, 1-methyl-5-(1-methylhydrazinyl)tetrazole, 1,2-bis[5-(1-methylhydrazinyl)-tetrazol-1-yl]ethane, 1,2-bis[5-(1-methylhydrazinyl)tetrazol-1-yl]propane, 1,4-bis[5-(1-methylhydrazinyl)tetrazol-1-yl]butane, 5,5'-bis-(1-methyl-tetrazole), 5,5'-bis(2-methyltetrazole), 1,2-di(tetrazol-1-yl) ethane, 1,2-di(tetrazol-1-yl)propane, 1,4-di(tetrazol-1-yl) butane, tris(2-(tetrazol-1-yl)-ethyl)amine, 1,1'-bis(1-methyltetrazol-5-yl)methane, 1,2-bis(1-methyltetrazol-5-yl) ethane, 1,2-bis(5-amino-tetrazol-1-yl)ethane, 1,3-bis(5-aminotetrazol-1-yl)-propane, 1,4-bis (5-aminotetrazol-1-yl) butane, 2-methyl-5-(tetrazol-1-yl)tetrazole, 1-(5-amino-1-methyl-1,2,4-triazol-3-yl)tetrazole, 5,5'-diamino-1,1'-dimethyl-3,3'-bis(1,2,4-triazole), 1,1'-dimethyl-3,3'-bis-1,2,4-triazole, 1,1'-bis(2-methyltetrazol-5-yl)amine, 1-methyl-1,1'-bis(2-methyltetrazol-5-yl)amine, 1,1'-di-(1,2,4-triazol-1-yl)methane or 1,1'-di(1,2,4-triazol-1-yl)methanimine.

12. The initiator or initiator mixture of claim 1, wherein the high-energy ligand is selected from 3-amino-1-nitroguanidine, 4-amino-3-hydrazino-1,2,4-triazole, 3-hydrazino-1-methyl-1,2,4-triazole, 1-methyl-1,2,4-triazole, 3-amino-1-methyl-1,2,4-triazole, 4-amino-1,2,4-triazole, 4,4'-bis-1,2,4-triazole, 1-methyltetrazole, 2-methyltetrazole, 1-methyl-5-amino-tetrazole, 2-methyl-5-aminotetrazole, 2-methyl-5-nitrotetrazole, 5-cyano-2-methyltetrazole, 1-methyl-5-(1-methylhydrazinyl)tetrazole, 1,2-bis[5-(1-methyl-hydrazinyl)tetrazol-1-yl]ethane, 5,5'-bis(2-methyltetrazole), 1,2-di(tetrazol-1-yl)ethane, 1,2-di-(tetrazol-1-yl)propane, 1,4-di(tetrazol-1-yl)butane, tris(2-(tetrazol-1-yl)ethyl)amine, 2-methyl-5-(tetra-zol-1-yl)tetrazole, 1,1'-dimethyl-3,3'-bis-1,2,4-triazole, 1-methyl-1,1'-bis(2-methyltetrazol-5-yl)amine or 1,1'-di(1,2,4-triazol-1-yl)methanimine.

13. The initiator or initiator mixture of claim 12, wherein the central metal is manganese.

14. The initiator or initiator mixture of claim 12, wherein the central metal is iron.

15. The initiator or initiator mixture of claim 12, wherein the central metal is nickel.

16. The initiator or initiator mixture of claim 12, wherein the central metal is copper.

17. The initiator or initiator mixture of claim 12, wherein the central metal is zinc.

18. The initiator or initiator mixture of claim 12, wherein the central metal is silver.

19. An initiating composition, wherein the composition comprises the lead-free initiator or lead-free initiator mixture of claim 1.

20. An igniting composition, wherein the composition comprises the lead-free initiator or lead-free initiator mixture of claim 1.

* * * * *